Oct. 14, 1947.  R. F. BERGMANN ET AL  2,428,774
UNITARY CASING FEED SECTION FOR CONVEYERS
Filed April 23, 1945  3 Sheets-Sheet 1
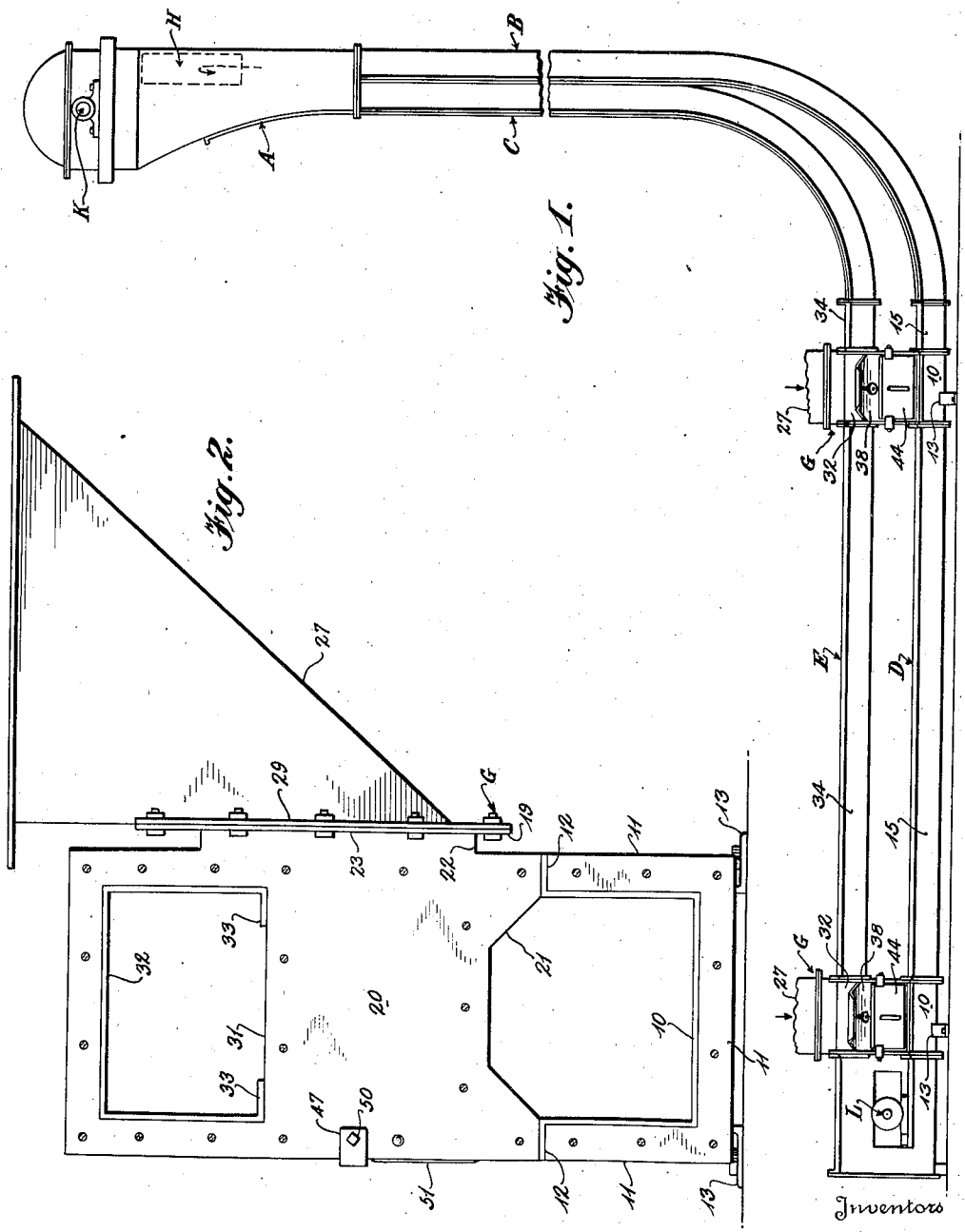
Inventors
Richard F. Bergmann and
Axel K. Sjolander
By L. Donald Myers
Attorney

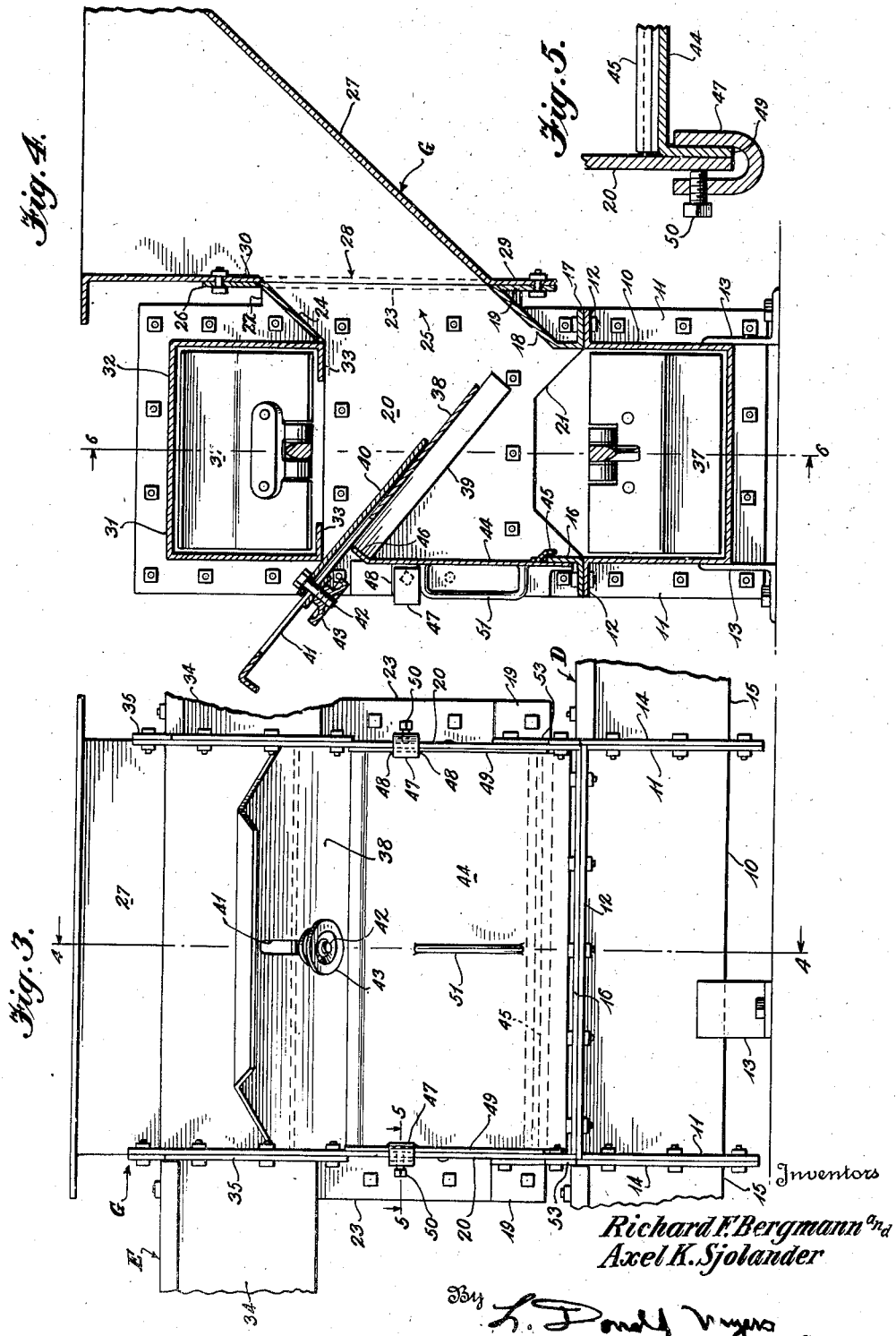
Oct. 14, 1947.  R. F. BERGMANN ET AL  2,428,774
UNITARY CASING FEED SECTION FOR CONVEYERS
Filed April 23, 1945  3 Sheets-Sheet 2
Inventors
Richard F. Bergmann and
Axel K. Sjolander

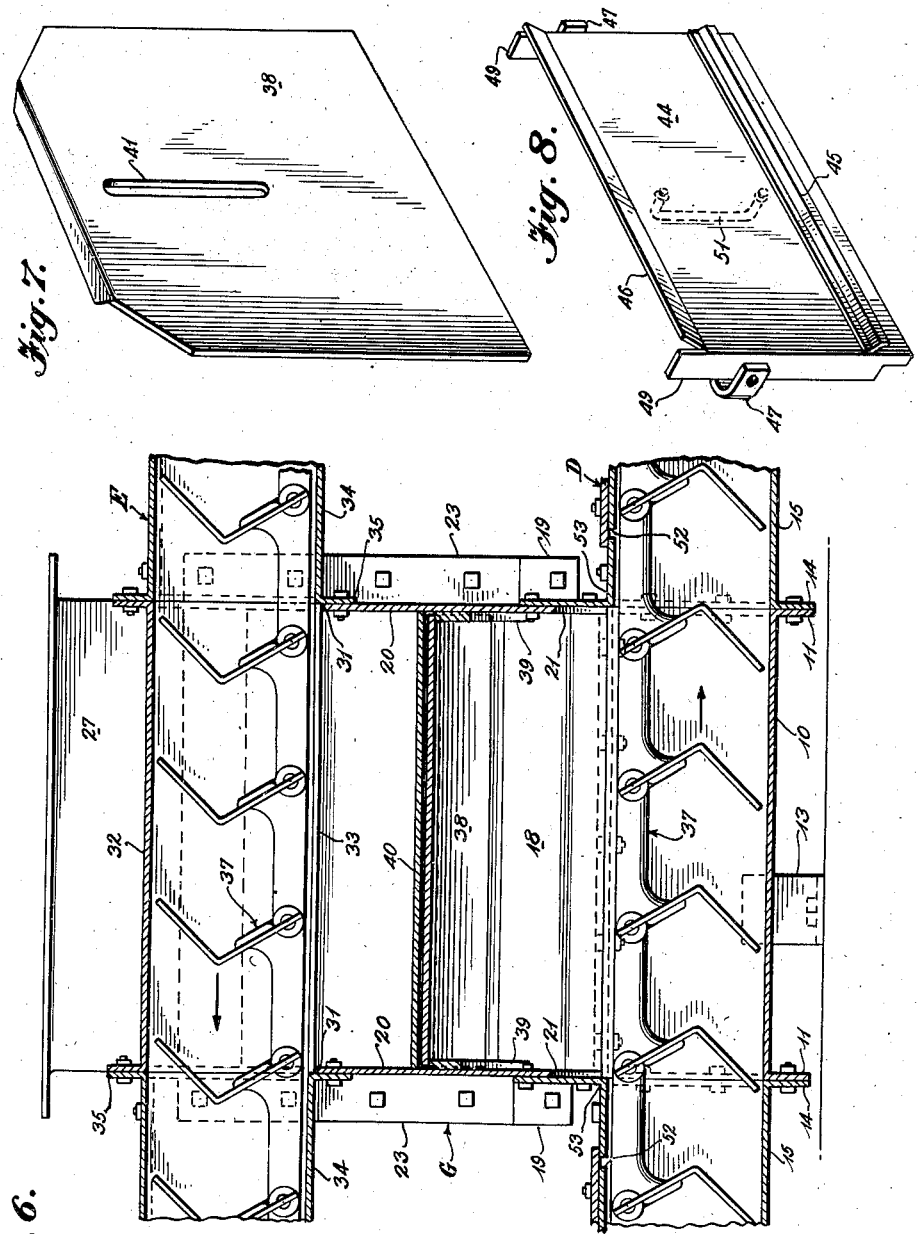

Patented Oct. 14, 1947

2,428,774

UNITED STATES PATENT OFFICE 2,428,774

UNITARY CASING FEED SECTION FOR CONVEYERS

Richard F. Bergmann, Winnetka, and Axel K. Sjolander, Chicago, Ill., assignors to Link-Belt Company, a corporation of Illinois Application April 23, 1945, Serial No. 589,862

23 Claims. (Cl. 198—56)

1

This invention relates to conveyors, and deals more specifically with casing feed sections for conveyors of the type adapted for moving flowable solids en masse through enclosed casings.

It is the primary object of this invention to provide a unitary conveyor casing feed section that is adapted for loading L-type conveyor-elevators, horizontal feeder conveyors, or the like, at any desired point, or points, along their lower horizontal runs.

A further important object of the invention is the provision of a unitary casing feed section which may be assembled or connected in a conveyor casing for either right hand or left hand loading, and which will operate to deliver a regulated amount of the material being conveyed to prevent overloading of the spaces between flights so as to avoid degradation of the material as a result of crowding.

More specific objects of the invention are to provide a conveyor casing feed section which is so constructed as to allow for inspection of the loading of the active run during operation of the conveyor and/or while effecting adjustment of the rate of feed of the material being conveyed; which is formed with suitable clean-outs to facilitate the removal of any foreign object that may become jammed between the conveyor casing and flights at the outlet or downstream side of the feed section; and which will deliver to the lower active run of the conveyor any material that is carried over to the inactive, return run.

Other objects and advantages of the invention will be apparent during the course of the following description.

In the accompanying drawings forming a part of this specification and in which like numerals are employed to designate like parts throughout the same, Figure 1 is a side elevational view of an L-type conveyor-elevator, which has been selected to illustrate the invention, with two of the novel, unitary casing feed sections illustrated as being assembled at desired locations in the horizontal run portion thereof, Figure 2 is an end elevational view of one of the unitary casing feed sections illustrated assembled in Fig. 1, Figure 3 is a front elevational view of the unitary casing feed section illustrated in Fig. 2,

2

Figure 4 is a vertical sectional view taken on line 4—4 of Fig. 3,

Figure 5 is a detail, horizontal sectional view taken on line 5—5 of Fig. 3,

Figure 6 is a vertical sectional view taken on line 6—6 of Fig. 4,

Figure 7 is a detail perspective view of a flow regulating plate which is illustrated as being assembled in Figs. 3, 4 and 6, and Figure 8 is a detail perspective view of a removable cover which is illustrated as being assembled in Figs. 3 and 4.

In the drawings, wherein for the purpose of illustration is shown the preferred embodiment of this invention, and first particularly referring to Fig. 1, there is illustrated an L-type conveyor-elevator which includes the casing head section A, the parallel, vertical casing legs B and C, and the horizontally arranged casing legs or runs D and E.

In this type of conveyor, an endless, flexible or articulated conveying mechanism is adapted to travel the endless path formed by the casing. The conveying mechanism is active, or functions to transport the material, while traveling through the lower horizontal leg or run D and the vertical leg B of the casing. The material to be transported is delivered to the lower horizontal leg or run portion D of the casing by means of the unitary casing feed sections G. Two of these casing feed sections are illustrated in Fig. 1, but it is to be understood that any desired number may be provided, depending upon the type of conveying operation that is to be performed. These unitary casing feed sections may be located at any desired point, or points, throughout the lengths of the horizontal casing legs or runs D and E by merely making the remaining sections of the casing of proper lengths and attaching their ends to the sides of the casing feed section.

The material being transported is moved through the lower horizontal leg or run D and upwardly through the vertical leg B to be discharged, in any desired direction, from the casing head section A. A discharge opening H is illustrated and is arranged to discharge the transported material from the far side of the casing head section A. It will be understood, however, that the discharge opening may be located on the near side of the casing head section, if desired. After passing over a head sprocket wheel, not shown, mounted on the head shaft K, the endless conveying mechanism passes downwardly through the return, vertical leg C and through the upper, horizontal leg or run E of the casing and is then bent around the foot sprocket wheel, not shown, that is carried by the take-up shaft L.

Although an L-type conveyor-elevator has been selected to illustrate the use of the novel unitary casing feed section, it will be understood that the casing feed section is equally adapted for use as an element of other types of conveyors which are provided with superimposed horizontal casing legs or runs such as, for example, horizontal feeder conveyors.

The novel, unitary casing feed section is best illustrated in detail in Figs. 2 to 4 inclusive and 6 and will be described, for the most part, in connection with these figures.

The reference character 10 designates a trough-shaped lower run portion which is provided with the outwardly directed end flanges 11 and the outwardly directed, longitudinally extending, top flanges 12. To properly support this run portion with respect to a floor, or the like, angle feet 13 are provided and are suitably welded, or otherwise secured, to the opposite sides of the run portion at their upper ends.

The end flanges 11 are employed for connecting this trough-shaped lower run portion 10 to the end flanges 14 of adjacent casing sections 15 of the lower, or active casing leg or run D, see Fig. 1.

Figs. 3 and 4 disclose an angle strip 16 as being bolted to the top, longitudinal flange 12 of the trough-shaped lower run portion 10 at the front of the unitary casing feed section. In other words, this angular strip 16 has one of its branches or flanges flatly engaging and bolted to the lower run flange 12 while the remaining branch or flange is arranged perpendicularly.

The remaining longitudinal, top flange 12 of the trough-shaped bottom run 10 has bolted thereto the flange 17 that is carried by the lower longitudinal edge of the angularly sectioned strip 18. The outer edge of this strip 18 carries a depending flange 19 which will be referred to again at a later point.

The ends of the unitary casing feed section are formed by the parallel, vertical end plates 20. By inspecting Figs. 2 and 6, it will be seen that these end plates 20 occupy the same vertical planes as the end flanges 11 of the trough-shaped bottom run portion 10. Fig. 2 provides a clear elevational disclosure of one of these end plates. It will be seen from this figure that the plate is cut away at 21, or at its bottom end portion, for a purpose to be described at a later point. The rear vertical edge of this end plate is formed with an extension 22. These extensions 22 are provided with laterally extending flanges 23 which are arranged in the same vertical plane as the depending flange 19 of the angular strip 18.

The opposite end edges of the angular strips 16 and 18, and of the flange 17 carried by the lower edge of the strip 18, are attached by welding to the inner faces of the end plates 20 for interconnecting and properly spacing these end plates. An additional strip 24 is provided and is connected at its opposite ends to the end plates 20 in the regions of the upper end portions of their lateral extensions 22. By inspecting Fig. 4, it will be seen that this plate 24 is arranged in parallelism with one branch of the angular strip 18. Therefore, the strip 24, the parallel branch of the angular strip 18, and the extension portions 22 of the end plates 20 collectively form a feed opening 25 for the unitary casing feed section. This feed opening 25, therefore, is of tubular, or throat-like, formation and has at its outer end the outwardly directed flanges 19 and 23, previously referred to, as well as the upstanding flange 26 that is attached to the outer edge of the strip 24. These various marginal flanges 19, 23 and 26 are employed for attaching a feed hopper, bin, or the like, 27 to the unitary casing feed section. It will be noted that the discharge opening 28 of this hopper or bin 27 is provided on three sides with the marginal flanges 29 for being connected by bolts to the previously referred to flanges 19 and 23. The top marginal portion 30 of the hopper or bin 27 is bolted to the upstanding flange 26.

Again referring to Fig. 2, it will be seen that each end plate 20 is provided with a rectangular opening 31 in its upper end portion. Fig. 6 discloses these openings as being arranged in horizontal alignment with each other.

Figs. 2, 4 and 6 disclose these openings 31 as having secured therein the opposite ends of the inverted, trough-shaped upper run portion 32. These same figures disclose the lower longitudinal edges of this trough-shaped run portion as having inwardly directed flanges 33. These flanges are spaced from each other at their free edges to provide an opening in the bottom of the top run portion 32 for the passage of material that may have reached the upper or return leg or run E of the conveyor. Any material that passes through this bottom opening of the upper trough-shaped run portion 32 will be redelivered to the lower run portion along with the material that is discharged by the hopper or bin 27.

The adjacent ends of the casing sections 34 of the upper horizontal run or leg E are provided with end flanges 35 to be bolted to the end plates 20 adjacent the aligned openings 31 formed in these end plates.

Figs. 4 and 6 disclose portions of the endless conveying mechanism 37 which travels through the conveyor casing. This conveying mechanism is illustrated as being of the type that is disclosed and claimed in the William W. Sayers patent, No. 2,235,854, issued March 25, 1941.

For the purpose of controlling or regulating the rate of flow of the material from the hopper or bin 27 into the trough-shaped lower run 10, for transportation by the conveying mechanism 37 as it travels through the bottom casing run or leg D of the conveyor, a flow regulating plate 38 is provided. Fig. 4 illustrates this plate 38 as extending diagonally through the feed space that is formed between or by the run portions 10 and 32 and the end plates 20 so as to intersect the flow path in the feed space for the material in passing from the feed opening 25 to the open top of the bottom run portion 10. To support this flow regulating plate 38, strips 39 are fastened to the inner faces of the end plates 20 to underlie the flow regulating plate 38. Additionally, a plate 40 is attached at its opposite ends to the end plates 20 and is arranged in spaced relation to the supporting strips 39 for providing a space through which the flow regulating plate 38 is adapted to move.

This flow regulating plate is illustrated in Figs. 4 and 7 as being provided with a slot 41 through which extends a bolt 42 that is suitably attached at its headed end to the upper marginal portion of the plate 40. A clamping nut 43 is threaded on the bolt 42. It will be appreciated, therefore, that this clamping nut may be loosened to permit adjustments of the flow regulating plate 38 and then tightened to hold this plate in its desired adjusted position.

The elements so far described provide a unitary casing feed section having the feed space which is closed in with the exception of the front which is provided with an opening that is defined by the angular strip 16 at its bottom, the side plates 20 at its opposite sides, and the flow regulating plate 38 at its top. With the front of the unitary casing feed section left open in this way, it is possible to inspect the material being delivered to the conveying mechanism passing through the bottom run portion 10 to determine whether the proper amount of material is being loaded into the conveying spaces that are left between the adjacent flights of the conveying mechanism 37. If the rate of feed of material is not satisfactory, the flow regulating plate 38 may be suitably adjusted.

It is not desirable to leave the front of this unitary casing feed section open at all times because of the escape of dust that would occur. Therefore, a detachable cover 44 is provided for this opening. This cover is illustrated in detail in Fig. 8 as including a bottom lip 45 that is adapted to hook over the top edge of the angular strip 16. An inwardly bent top flange 46 is provided at the top edge of the cover 44. This flange 46 is illustrated in Fig. 4 as bearing against the upper ends of the strips 39 which guide and support the flow regulating plate 38. This engagement helps to position the cover 44.

To fasten the cover in place, U-shaped clamps 47 are welded at 48 to the end flanges 49 of the cover. These clamps 47 will fit over the adjacent edges of the end plates 20 and clamping screws 50 are tightened to hold the cover 44 in place. A suitable handle 51 is provided for the cover to facilitate manipulation of the latter.

In describing the end plates 20, it was pointed out that their lower edges are cut away at 21. These cut away portions cooperate with the cut away portions 52, see Fig. 6, in the adjacent tops or covers of the lower run casing sections 15 to provide cleanouts through which foreign objects may be removed. These foreign objects occasionally reach the conveying mechanism 37, passing through the lower run portion 10, and if they are large enough, they will jam between the flights of the conveying mechanism and the conveyor casing at the discharge side of the unitary casing feed section. Such foreign objects may be removed through the appropriate cleanout. To cover these cleanouts, angular closure plates 53 are provided.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, we claim:

1. In a conveyor, or the like, for transporting flowable solids through an endless enclosing casing disposed in a desired closed path including two spaced, parallel runs, and an endless conveying mechanism operating in said casing, the improvement which comprises a unitary casing feed section forming a part of both of said parallel runs, said casing feed section comprising two spaced, parallel, inwardly opening trough-shaped run portions through which the conveying mechanism passes, a feed hopper located at one side of the casing feed section and discharging into the space between said trough-shaped run portions to deliver the material to be transported to the conveying mechanism passing through one of said run portions, and a removable cover for closing the space between the trough-shaped run portions on the side opposite the feed hopper.

2. In a conveyor, or the like, for transporting flowable solids through an endless enclosing casing disposed in a desired closed path including two spaced, superimposed runs, and an endless conveying mechanism operating in said casing, the improvement which comprises a unitary casing feed section forming a separable part of both of said superimposed runs, said casing feed section comprising two superimposed run portions, with the lower run portion open at its top, through which the conveying mechanism passes, vertical end plates for positioning the run portions relative to each other to form a feed space above the open top of said lower run and for closing the ends of said space, means forming a flanged feed opening at one side of said feed space, a feed hopper attached to the flanges of said feed opening for discharging into the said feed space to deliver the material to be transported to the conveying mechanism passing through the open topped lower run portion, and a removable cover for closing the opposite side of said feed space.

3. In a conveyor, or the like, for transporting flowable solids through an endless enclosing casing disposed in a desired closed path including two spaced, parallel runs, and an endless conveying mechanism operating in said casing, the improvement which comprises a unitary casing feed section forming a part of both of said parallel runs, said casing feed section comprising two spaced, parallel, inwardly opening trough-shaped run portions through which the conveying mechanism passes, a feed hopper located at one side of the casing feed section and discharging into the space between said trough-shaped run portions to deliver the material to be transported to the conveying mechanism passing through one of said run portions, means associated with the space between said run portions to regulate the rate of delivery of the material to the conveying mechanism, and a removable cover for closing the space between the trough-shaped run portions on the side opposite the feed hopper.

4. In a conveyor, or the like, for transporting flowable solids through an endless enclosing casing disposed in a desired closed path including two spaced, superimposed runs, and an endless conveying mechanism operating in said casing, the improvement which comprises a unitary casing feed section forming a separable part of both of said superimposed runs, said casing feed section comprising two superimposed run portions, with the lower run portion open at its top, through which the conveying mechanism passes, vertical end plates for positioning the run portions relative to each other to form a feed space above the open top of said lower run and for closing the ends of said space, means forming a flanged feed opening at one side of said feed space, a feed hopper attached to the flanges of said feed opening for discharging into the said feed space to deliver the material to be transported to the conveying mechanism passing through the open topped lower run portion, means extending into the feed space through the open side thereof opposite said feed opening to regulate the rate of flow of the material through the feed space to the open top of the lower run, and a removable cover for closing the remainder of the said open side of the feed space.

5. In a conveyor, or the like, for transporting flowable solids through an endless enclosing casing disposed in a desired closed path including two spaced, parallel runs, and an endless conveying mechanism operating in said casing, the improvement which comprises a unitary casing feed section forming a part of both of said parallel runs, said casing feed section comprising two spaced, parallel, inwardly opening trough-shaped run portions through which the conveying mechanism passes, a feed hopper located at one side of the casing feed section and discharging into the space between said trough-shaped run portions to deliver the material to be transported to the conveying mechanism passing through one of said run portions, a flow regulating plate extending through the space between said run portions to intersect the flow path for the material being delivered to the conveying mechanism from the feed hopper, means for adjustably supporting said plate, and a removable cover for closing the space between the trough-shaped run portions on the side opposite the feed hopper.

6. In a conveyor, or the like, for transporting flowable solids through an endless enclosing casing disposed in a desired closed path including two spaced, superimposed runs, and an endless conveying mechanism operating in said casing, the improvement which comprises a unitary casing feed section forming a separable part of both of said superimposed runs, said casing feed section comprising two superimposed run portions, with the lower run portion open at its top, through which the conveying mechanism passes, vertical end plates for positioning the run portions relative to each other to form a feed space above the open top of said lower run and for closing the ends of said space, means forming a flanged feed opening at one side of said feed space, a feed hopper attached to the flanges of said feed opening for discharging into the space between said superimposed run portions to deliver the material to be transported to the conveying mechanism passing through the open topped lower run portion, a flow regulating plate extending into the feed space through the open side thereof opposite said feed opening to intersect the flow path of the material through the feed space to the conveying mechanism from the feed hopper, means for adjustably supporting said plate, and a removable cover for closing the remainder of the open side of said feed space.

7. In a conveyor, or the like, for transporting flowable solids through an endless enclosing casing disposed in a desired closed path including two spaced, superimposed runs, and an endless conveying mechanism operating in said casing, the improvement which comprises a unitary casing feed section forming a part of both of said superimposed runs, said casing feed section comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through said upper run, a feed hopper located at one side of the casing feed section and discharging into the space between said superimposed run portions to deliver the material to be transported to the conveying mechanism passing through the open topped lower run portion, and a removable cover for closing the space between the superimposed run portions on the side opposite the feed hopper.

8. In a conveyor, or the like, for transporting flowable solids through an endless enclosing casing disposed in a desired closed path including two spaced superimposed runs, and an endless conveying mechanism operating in said casing, the improvement which comprises a unitary casing feed section forming a part of both of said superimposed runs, said casing feed section comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through said upper run, a feed hopper located at one side of the casing feed section and discharging into the space between said superimposed run portions to deliver the material to be transported to the conveying mechanism passing through the open topped lower run portion, means associated with the space between said run portions to regulate the rate of delivery of the material to the conveying mechanism, and a removable cover for closing the space between the superimposed run portions on the side opposite the feed hopper.

9. In a conveyor, or the like, for transporting flowable solids through an endless enclosing casing disposed in a desired closed path including two spaced, superimposed runs, and an endless conveying mechanism operating in said casing, the improvement which comprises a unitary casing feed section forming a part of both of said superimposed runs, said casing feed section comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through the upper run, a feed hopper located at one side of the casing feed section and discharging into the space between said superimposed run portions to deliver the material to be transported to the conveying mechanism passing through the open topped lower run portion, a flow regulating plate extending through the space between said run portions to intersect the flow path for the material being delivered to the conveying mechanism from the feed hopper, means for adjustably supporting said plate, and a removable cover for closing the space between the superimposed run portions on the side opposite the feed hopper.

10. A unitary casing feed section for conveyors adapted for transporting flowable solids en masse through an endless enclosed casing by means of an articulated conveying mechanism, comprising two spaced, parallel, inwardly opening trough-shaped run portions through which the conveying mechanism passes, end plates for interconnecting said run portions, a feed hopper located at one side of the casing feed section and discharging into the space between said trough-shaped run portions to deliver the material to be transported to the conveying mechanism passing through one of said run portions, and a removable cover for closing the space between the trough-shaped run portions on the side opposite the feed hopper.

11. A unitary casing feed section for conveyors adapted for transporting flowable solids en masse through an endless enclosed casing by means of an articulated conveying mechanism, comprising two spaced, superimposed run portions, with the lower run portion open at its top, through which the conveying mechanism passes, end plates for interconnecting said run portions in their intended spaced relation to form a feed space therebetween and to close the opposite ends of said feed space, means associated with the upper and lower run portions and the end plates to form one side of the feed space into a flanged feed opening, a feed hopper attached to the flanges of the feed opening for discharging into the feed space the material to be transported by the conveying mechanism passing through the open topped lower run portion, and a removable cover for closing the opposite side of said feed space.

12. A unitary casing feed section for conveyors adapted for transporting flowable solids en masse through an endless enclosed casing by means of an articulated conveying mechanism, comprising two spaced parallel, inwardly opening trough-shaped run portions through which the conveying mechanism passes, end plates for connecting the two run portions, a feed hopper located at one side of the casing feed section and discharging into the space between said trough-shaped run portions to deliver the material to be transported to the conveying mechanism passing through one of said run portions, means associated with the space between said run portions to regulate the rate of delivery of the material to the conveying mechanism, and a removable cover for closing the space between the trough-shaped run portions on the side opposite the feed hopper.

13. A unitary casing feed section for conveyors adapted for transporting flowable solids en masse through an endless enclosed casing by means of an articulated conveying mechanism, comprising two spaced, superimposed run portions with the lower run portion open at its top, through which the conveying mechanism passes, end plates for connecting said run portions in their intended spaced relation to form a feed space therebetween and to close the opposite ends of said feed space, means associated with the upper and lower run portions and the end plates to form one side of the feed space into a flanged feed opening, a feed hopper attached to the flanges of the feed opening for discharging into the feed space the material to be transported by the conveying mechanism passing through the open topped lower run portion, means extending into the feed space to regulate the rate of flow of the material through the feed space to the conveying mechanism, and a removable cover plate for closing the opposite side of the feed space.

14. A unitary casing feed section for conveyors adapted for transporting flowable solids en masse through an endless enclosed casing by means of an articulated conveying mechanism, comprising two spaced, parallel, inwardly opening trough-shaped run portions through which the conveying mechanism passes, end plates for connecting said run portions, a feed hopper located at one side of the casing feed section and discharging into the space between said trough-shaped run portions to deliver the material to be transported to the conveying mechanism passing through one of said run portions, a flow regulating plate extending through the space between said run portions to intersect the flow path for the material being delivered to the conveying mechanism from the feed hopper, means for adjustably supporting said plate, and a removable cover for closing the space between the trough-shaped run portions on the side opposite the feed hopper.

15. A unitary casing feed section for conveyors adapted for transporting flowable solids en masse through an endless enclosed casing by means of an articulated conveying mechanism, comprising two spaced, superimposed run portions, with the lower run portion open at its top, through which the conveying mechanism passes, end plates for connecting said run portions in their intended spaced relation to form a feed space therebetween and to close the opposite ends of said feed space, means associated with the upper and lower run portions and the end plates to form one side of the feed space into a flanged feed opening, a feed hopper attached to the flanges of the feed opening for discharging into the feed space the material to be transported by the conveying mechanism passing through the open topped lower run portion, a flow regulating plate extending into the feed space to regulate the flow of the material through the feed space to the conveying mechanism, means for adjustably supporting said plate, and a removable cover for closing the opposite side of the feed space.

16. A unitary casing feed section for conveyors adapted for transporting flowable solids en masse through an endless enclosed casing by means of an articulated conveying mechanism, comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through said upper run, end plates for connecting said run portions, a feed hopper located at one side of the casing feed section and discharging into the space between said superimposed run portions to deliver the material to be transported to the conveying mechanism passing through the open topped lower run portion, and a removable cover plate for closing the space between the superimposed run portions on the side opposite the feed hopper.

17. A unitary casing feed section for conveyors adapted for transporting flowable solids en masse through an endless enclosed casing by means of an articulated conveying mechanism, comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through said upper run portion, end plates for connecting the run portions, a feed hopper located at one side of the casing feed section and discharging into the space between said superimposed run portions to deliver the material to be transported to the conveying mechanism passing through the open topped lower run portion, means associated with the space between said run portions to regulate the rate of delivery of the material to the conveying mechanism, and a removable cover for closing the space between the superimposed run portions on the side opposite the feed hopper.

18. A unitary casing feed section for conveyors adapted for transporting flowable solids en masse through an endless enclosed casing by means of an articulated conveying mechanism, comprising two spaced, superimposed run portions through which the conveying mechanism passes, the lower one of said run portions being open at its top to allow for delivery of the material to be transported to the conveying mechanism passing therethrough, the upper one of said run portions having longitudinal marginal flanges at its bottom to support the conveying mechanism passing therethrough and being open between said flanges to discharge into the space between said run portions any material that is being transported through said upper run portion, end plates for connecting the run portions, a feed hopper located at one side of the casing feed section and discharging into the space between said superimposed run portions to deliver the material to be transported to the conveying mechanism passing through the open topped lower run portion, a flow regulating plate extending through the space between said run portions to intersect the flow path for the material being delivered to the conveying mechanism from the feed hopper, means carried by the end plates for adjustably supporting said flow regulating plate, and a removable cover for closing the space between the superimposed run portions on the side opposite the feed hopper.

19. A unitary casing feed section for conveyors adapted for transporting flowable solids en masse through an endless enclosed casing by means of an articulated conveying mechanism, comprising a trough-shaped lower run portion having outwardly extending flanges at its top and end edges, two parallel end plates positioned above and in the same planes as said end flanges, angular sectioned strips attached at their ends to the lower corners of said end plates to interconnect the latter and bolted to the top flanges of said lower run portion to interconnect said end plates and run portion, an additional angular sectioned strip attached at its ends to the upper portions of said end plates and in parallelism with one of said first mentioned strips to form a side feed opening, a feed hopper communicating with said feed opening, said end plates having aligned openings formed in their upper portions, an inverted trough-shaped upper run portion having its opposite ends secured in said end plate openings, a flow regulating plate extending through the space between said run portions to intersect the path between the feed opening and the lower run portion, means attached to the end plates for adjustably supporting the flow regulating plate, and a removable cover for closing the side of the casing feed section opposite said feed opening.

20. A prefabricated casing feed section adapted to be assembled as a unit at any desired location in the superimposed horizontal casing legs of conveyors adapted for transporting flowable solids en masse, comprising upper and lower casing portions with the lower portion open at its top, a pair of end plates attached to the casing portions for positioning the same to form a feed space therebetween communicating with the lower casing portion through its open top, said casing portions and end plates having means for attaching the casing feed section to the adjacent ends of superimposed horizontal conveyor casing legs, means associated with said casing portions and end plates for forming one side of the feed space into a feed opening, and a plate for closing the opposite side of the feed space.

21. A prefabricated casing feed section adapted to be assembled as a unit at any desired location in the superimposed horizontal casing legs of conveyors adapted for transporting flowable solids en masse, comprising upper and lower casing portions with the lower portion open at its top, a pair of end plates attached to the casing portions for positioning the same to form a feed space therebetween communicating with the lower casing portion through its open top, said casing portions and end plates having means for attaching the casing feed section to the adjacent ends of superimposed horizontal conveyor casing legs, means associated with said casing portions and end plates for forming one side of the feed space into a feed opening, a feed hopper positioned at the last mentioned side of the feed space and communicating with said space through the feed opening, and a plate for closing the opposite side of the feed space.

22. A prefabricated casing feed section adapted to be assembled as a unit at any desired location in the superimposed horizontal casing legs of conveyors adapted for transporting flowable solids en masse, comprising upper and lower casing portions with the lower portion open at its top, a pair of end plates attached to the casing portions for positioning the same to form a feed space therebetween communicating with the lower casing portion through its open top, said casing portions and end plates having means for attaching the casing feed section to the adjacent ends of superimposed horizontal conveyor casing legs, means associated with said casing portions and end plates for forming a feed opening at one side of the feed space, a flow regulating plate extending diagonally through the said feed space so as to intersect the path of material flowing through the feed space from the feed opening to the open top of the lower casing portion, and a removable cover for closing the side of the feed space opposite the feed opening.

23. A prefabricated casing feed section adapted to be assembled as a unit at any desired location in the superimposed horizontal casing legs of conveyors adapted for transporting flowable solids en masse, comprising upper and lower, inwardly opening, trough-shaped casing portions, means for connecting and supporting said casing portions to form a feed space therebetween and to close the ends of said space, means for connecting the ends of the casing feed section to the adjacent ends of superimposed horizontal conveyor casing legs with the trough-shaped casing portions in alignment with said conveyor casing legs, means for forming a feed opening at one side of said feed space, and a plate closing the opposite side of said space.

RICHARD F. BERGMANN.
AXEL K. SJOLANDER.

REFERENCES CITED

The following references are of record in the file of this patent:

UNITED STATES PATENTS

| Number | Name | Date |
|---|---|---|
| 2,339,491 | Lemmon | Jan. 18, 1944 |
| 2,373,765 | Lemmon | Apr. 17, 1945 |

OTHER REFERENCES

Catalog 140, "Redler Conveyor-Elevators," Stephens-Adamson Mfg. Company, Aurora, Ill. Copyright 1940.